(12) United States Patent
Hammond et al.

(10) Patent No.: US 6,411,530 B2
(45) Date of Patent: Jun. 25, 2002

(54) DRIVE AND POWER SUPPLY WITH PHASE SHIFTED CARRIERS

(75) Inventors: Peter Hammond, Greensburg; Mukul Rastogi, Monroeville, both of PA (US)

(73) Assignee: Robicon Corporation, New Kensington, PA (US)

( * ) Notice: Subject to any disclaimer, the term of this patent is extended or adjusted under 35 U.S.C. 154(b) by 0 days.

(21) Appl. No.: 09/827,652

(22) Filed: Apr. 6, 2001

Related U.S. Application Data

(60) Provisional application No. 60/195,080, filed on Apr. 6, 2000.

(51) Int. Cl.$^7$ ............... H02M 1/12; H02M 1/14; H02M 7/00
(52) U.S. Cl. ............... 363/41; 363/67; 363/71
(58) Field of Search ............... 363/40, 41, 65, 363/67, 68, 69, 70, 71

(56) References Cited

U.S. PATENT DOCUMENTS

| | | | |
|---|---|---|---|
| 5,587,892 A | * 12/1996 | Barrett | 363/44 |
| 5,656,924 A | * 8/1997 | Mohan et al. | 323/210 |
| 5,668,707 A | * 9/1997 | Barrett | 363/44 |
| 5,747,972 A | * 5/1998 | Baretich et al. | 323/223 |
| 5,912,549 A | * 6/1999 | Farrington et al. | 323/207 |
| 6,229,288 B1 | * 5/2001 | Baretich et al. | 323/223 |

OTHER PUBLICATIONS

Rendusara, D., Cengelci, E., Enjeti, P., Stefanovic, V.R., Gray, W., Analysis of Common Mode voltage—"Neutral Shift" in Medium Voltage PWM Adjustable Speed Drive (Mv–ASD) Systems, IEEE Power Electronics Specialist Conferen (PESC), Jun. 1999.

Matsui, Keiju, UEDA, Fukashi, Kawata, Y., Tsuboi, K., Iwata, K. Novel Modulation Strategies of Parallel Connected NPC–PWM Inverters for AC Motor Drives, IEEE, 0–7803–3444, Sep., 1996, pp. 47–53.

* cited by examiner

*Primary Examiner*—Bao Q. Vu
(74) *Attorney, Agent, or Firm*—Buchanan Ingersoll, P.C.

(57) ABSTRACT

This invention is an improvement to a multi-level, multi-phase power supply. Typically, in such power supplies, each of the phases has one or more power cells providing a pulse width modulated output. In such a configuration, when the transition of the pulse width modulated outputs of corresponding power cells in different phases occurs simultaneously, a double step in voltage is observed on the output of the power cell. This invention is an improvement over the prior art wherein the transitions of the outputs of the power cells are controlled to avoid simultaneous transitions.

10 Claims, 10 Drawing Sheets

Voltage THD = 16.5%, Current THD = 4.7%.

Voltage THD = 20.9%, Current THD = 6.1%.

Voltage THD = 16.5%, Current THD = 4.7%.

Experimental waveforms of line-to-line voltage and load current from a 12-cell power supply operating an AC motor.

DRIVE AND POWER SUPPLY WITH PHASE SHIFTED CARRIERS

RELATED APPLICATIONS

This application claims the benefit of U.S. Provisional patent application No. 60/195,080, filed Apr. 6, 2000.

1. Field of the Invention

This invention relates to pulse-width modulation in a multi-level power supply. Such a power supply applies readily to motor drive and power supply applications that utilize inverters or cells with low-voltage rated semiconductors to produce high voltages or high currents.

2. Description of Prior Art

Pulse-width-modulation (PWM) is commonly used in inverters for variable speed drives and power supplies and other applications. Single inverters use a single triangular carrier to generate the PWM signals for controlling the semiconductor devices. On the other hand, multi-level inverters, such as the one disclosed in U.S. Pat. No. 5,625,545 (Hammond), which is incorporated herein by reference, use multiple, phase-shifted triangular carriers to improve the output waveform to the load. Hammond suggests the use of N phase-shifted carriers, where each carrier is phase-shifted from its neighbors by 180°/N and where N is the number of ranks per phase (i.e., the number of series-connected inverters per phase). Thus, for a three phase system there are a total of 3N cells. With the assignment of phase shifts disclosed in Hammond, the three cells in a given rank (i.e., one cell from each phase) share the same triangular carrier.

FIG. 1 shows the power circuit of a cell, such as was disclosed in U.S. Pat. No. 5,625,545 (Hammond). Each cell receives power from a three-phase source. The diode-bridge rectifier converts the input ac voltage to a substantially constant dc voltage that is supported by capacitors connected across the rectifier output. The output stage is an H-Bridge inverter that consists of two poles, a left pole and a right pole, each with two devices. The inverter transforms the dc voltage across the dc capacitors to an ac output using PWM of the semiconductor devices. This invention is an improvement on Hammond that relates to the switching of these devices; hence, only the output stage of these cells will be discussed hereinafter.

The two devices in a particular pole receive complementary gating signals; i.e. when the upper device is gated ON, the lower device is gated OFF and vice versa. In this description we define the pole-gating signal to be a means of describing the gating signals of both the (upper and lower) devices in that pole. When the pole-gating signal is high, the upper device is gated ON and the lower device is gated OFF, and vice versa. The gating signals for a pole are determined by comparing the voltage command with the triangular carrier, while the gating signals for the other pole are determined by comparing the same voltage command with the negated triangular carrier. This is shown in FIG. 2 where the output of each pole is shown separately. The cell output is the difference of the two gating signals scaled by the DC voltage.

The cell output voltage has three levels, each of which corresponds to a different voltage at the output terminals of the cell. These levels are described below.

1. The HIGH level corresponds to an output voltage equal to +Vdc, where Vdc is the total dc bus voltage supported by the capacitors.
2. The ZERO level corresponds to zero voltage at the output of the cell. 3. The LOW level corresponds to an output voltage equal to −Vdc. Thus the cell output is different from a six-switch inverter (that is traditionally utilized in low voltage drives) that has only two-levels in the output phase voltage waveform. A circuit topology that results in an output waveform with more than two levels is considered as a multi-level topology.

FIG. 3 shows the three-phase voltage references and triangular carrier that are required by Hammond to generate the PWM signals for one rank of cells (i.e., one cell from each phase). Note that the same triangular carrier (and its negated counterpart) is used for all the three cells in the rank. From this figure, it can also be observed that there are distinct 60° intervals (or ⅙th of the period of the phase-voltage command as shown in FIG. 3) during which two phase-voltage commands have the same magnitude but opposite signs. These intervals are marked at the top of FIG. 3. For example, the comment |A|=|B| in the first interval, means that the voltage commands for phases A and B have the same magnitude during that interval. During these intervals the transition (i.e., switching) of one cell's left pole gating signal coincides with the transition of the second cell's right pole gating signal. This is because both the carrier signal and its inverted value are used in generating the left pole and right pole gating signals for every cell (or H-bridge inverter). The result is a simultaneous change in opposite directions of the outputs of two cells that receive phase-voltage commands with equal magnitudes. This leads to an undesirable step of twice the cell dc bus voltage in the line-to-line voltage. Moreover, these steps occur when the output line-to-line voltage of the power supply is going through its peak value. FIG. 3 also shows examples of instances (encircled) where the outputs of two cells from different phases change state simultaneously. This process repeats every 60° in the two phases that have equal magnitudes of phase voltage command values.

The total output voltage of each phase of the power supply is generated by the addition of all the cell output voltages in that phase. As described earlier, the cells in a given phase receive phase-shifted triangular carriers to increase the number of voltage levels in the output voltage waveform. The number of levels in the line-to-line output voltage waveform is given by (4N+1), where N is the number of ranks in the power supply.

TABLE 1

Phase shift (in degrees) of carriers in a 9-cell Power Supply based on Hammond. Cells in rank 1 are assumed to have a phase shift of zero.

| Rank #\Phase | A | B | C |
|---|---|---|---|
| 1 | 0 | 0 | 0 |
| 2 | 60 | 60 | 60 |
| 3 | 120 | 120 | 120 |

A power supply with a total of 9-cells (i.e., three phases with three cells per phase, or N=3) is considered as an example. The phase shift for each cell is shown in Table 1. According to Hammond, all cells in a given rank receive the same carrier. FIG. 4 shows the total phase voltage of one phase of the power supply. Notice that there are 13 distinct levels in the line-to-line output voltage. The effect of a simultaneous change in opposite directions of the outputs of two cells that receive phase-voltage commands with equal magnitudes can be clearly seen in the voltage waveform. Double steps are observed at the peak of the voltage waveform. Such effects increase the peak output voltage applied to the load. In addition, when long cables are used between the power supply and the load, these double steps are amplified at the load terminals by travelling wave effects resulting in increased voltage distortion. Also shown in FIG. 4 is an output current waveform that results when a 9-cell power supply is connected to a motor with low leakage inductance. A motor such as this is considered to amplify the effect of harmonics for comparison purposes.

It would therefore be desirable to eliminate the simultaneous changes of the gate signals in the cells to eliminate or reduce the double steps observed in the line to-line voltage at the peak of the voltage waveform.

SUMMARY OF INVENTION

This invention presents a new modulation technique for multi-level inverters that generate an AC output. The resulting drive waveforms exhibit lower peak voltages and reduced harmonic distortion. The result is an improvement in the characteristics of the voltage and current waveforms over Hammond.

DESCRIPTION OF INVENTION

In the proposed method, the number of phase-shifted carriers equals the total number of series-connected cells. In other words, if there are a total of 3N cells for a three-phase power converter, with N cells in each phase, then 3N phase-shifted carriers are used, one for each inverter, with the phase shift between neighboring carriers being 180°/3N. Such an assignment of phase shifts prevents the cells within a given rank from switching simultaneously when the phase voltage commands have equal magnitudes. This avoids the double steps on the peak of the output line-to-line voltage waveform.

Figure 5:
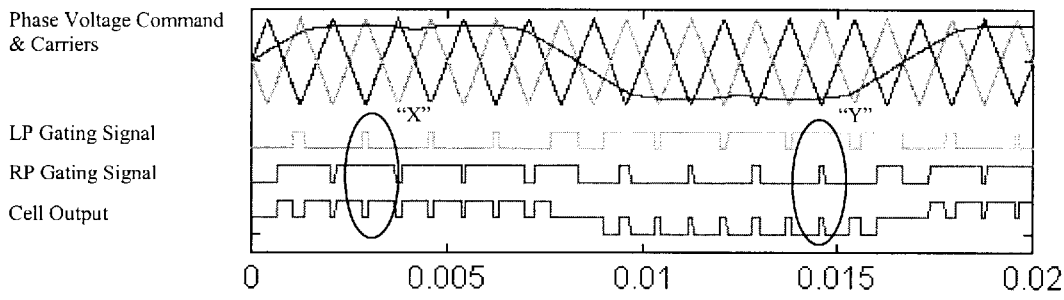
FIG. 5 shows the three-phase voltage commands and triangular carriers for one rank of cells according to this invention.
Figure 5:
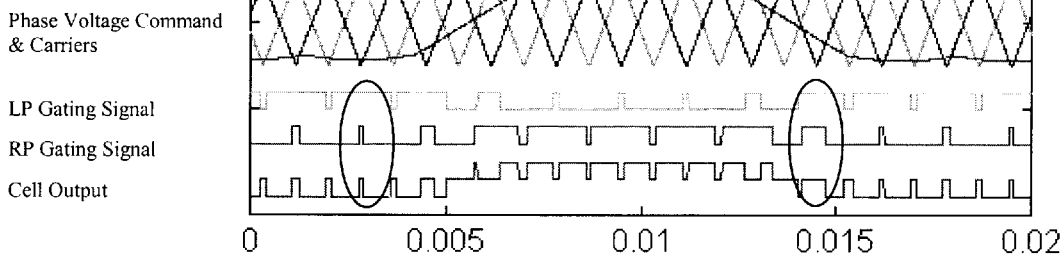
Figure 5:
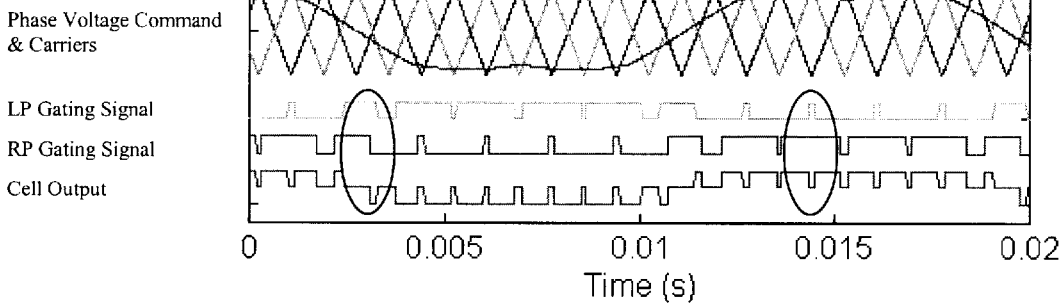
Figure 6:
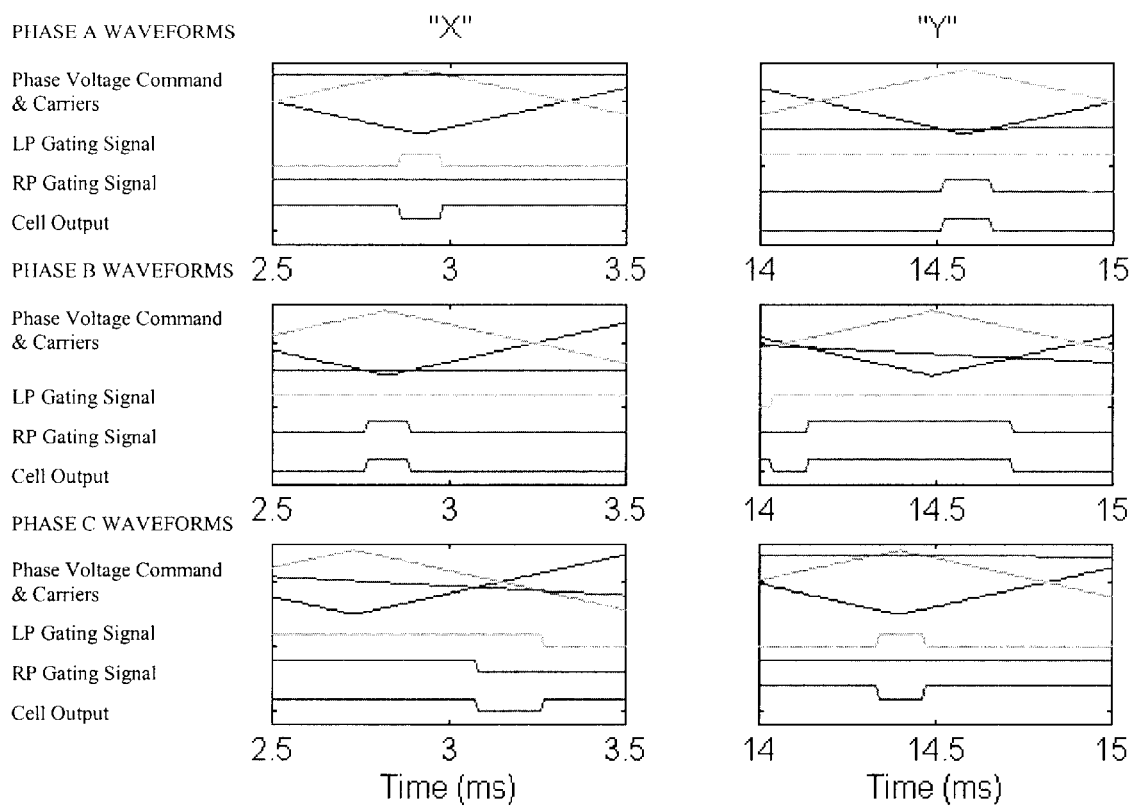
FIG. 6 is a time-expanded view of a regions "X" and "Y" from FIG. 5.

As a comparison with the 9-cell Power Supply considered earlier, the phase shifts with the proposed method are shown in Table 2. FIG. 5 shows the three-phase voltage references and triangular carriers that are required to generate the PWM signals for one rank of cells. Note that the triangular carriers for the cells (and their negated counterparts) are phase-shifted from their neighbors. This results in cell output changes that are close with respect to one another but are not simultaneous. Regions "X" and "Y" in FIG. 5 are time-expanded in FIG. 6 to show the non-simultaneous transitions more clearly.

TABLE 2

Phase shift (in degrees) of carriers in each cell of 9-cell Power Supply per this invention.
Phase A in cell group 1 is assumed to have a phase shift of zero.

| Rank #\Phase | A | B | C |
|---|---|---|---|
| 1 | 0 | 20 | 40 |
| 2 | 60 | 80 | 100 |
| 3 | 120 | 140 | 160 |

Figure 1:
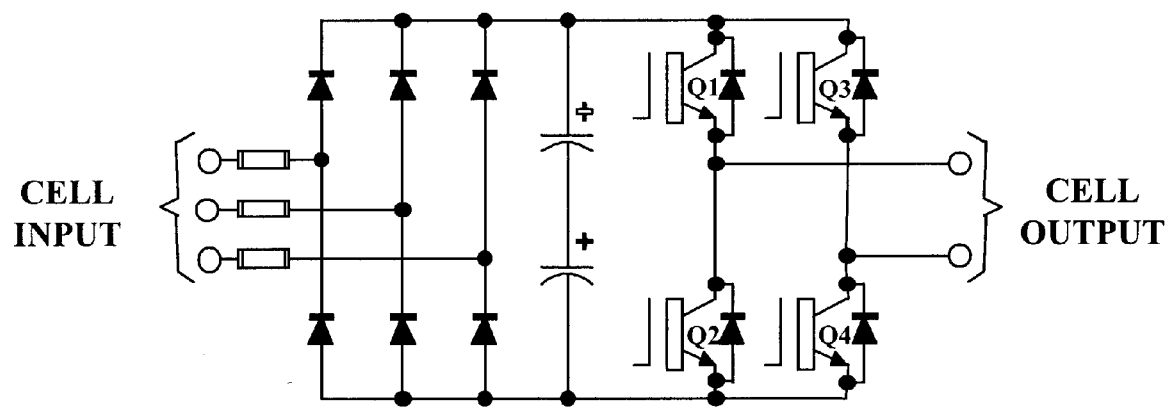
FIG. 1 shows a prior art power circuit of a cell, as disclosed in U.S. Pat. No. 5,625,545 (Hammond).
Figure 2:
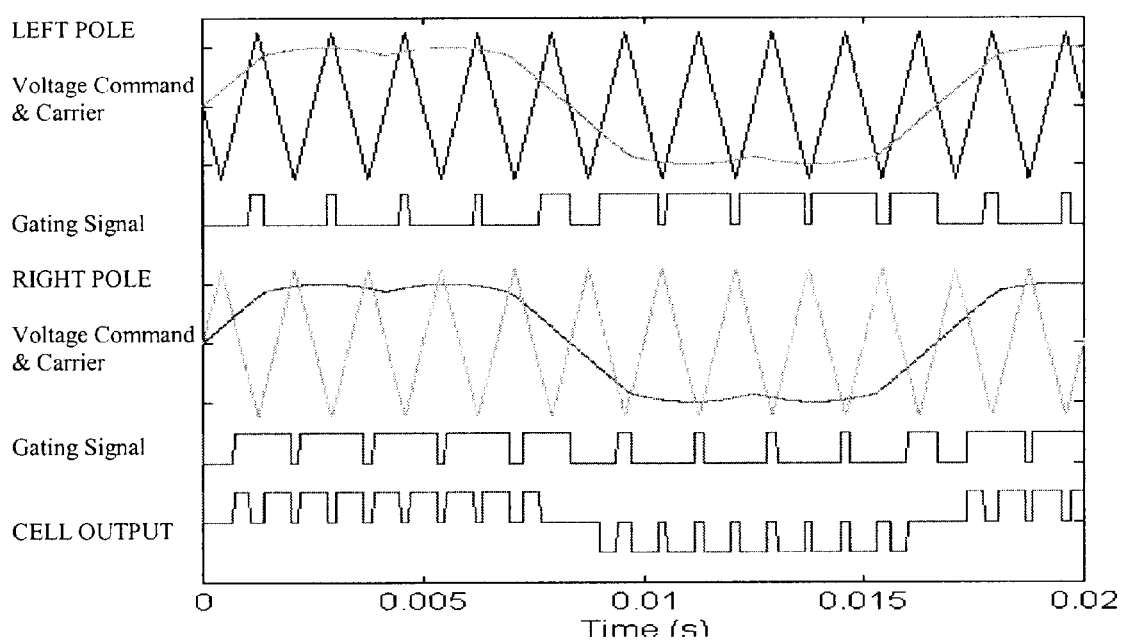
FIG. 2 shows the derivation of the gatings signals as a function of the voltage command and triangular carrier for the prior art power circuit of FIG. 1.
Figure 3:
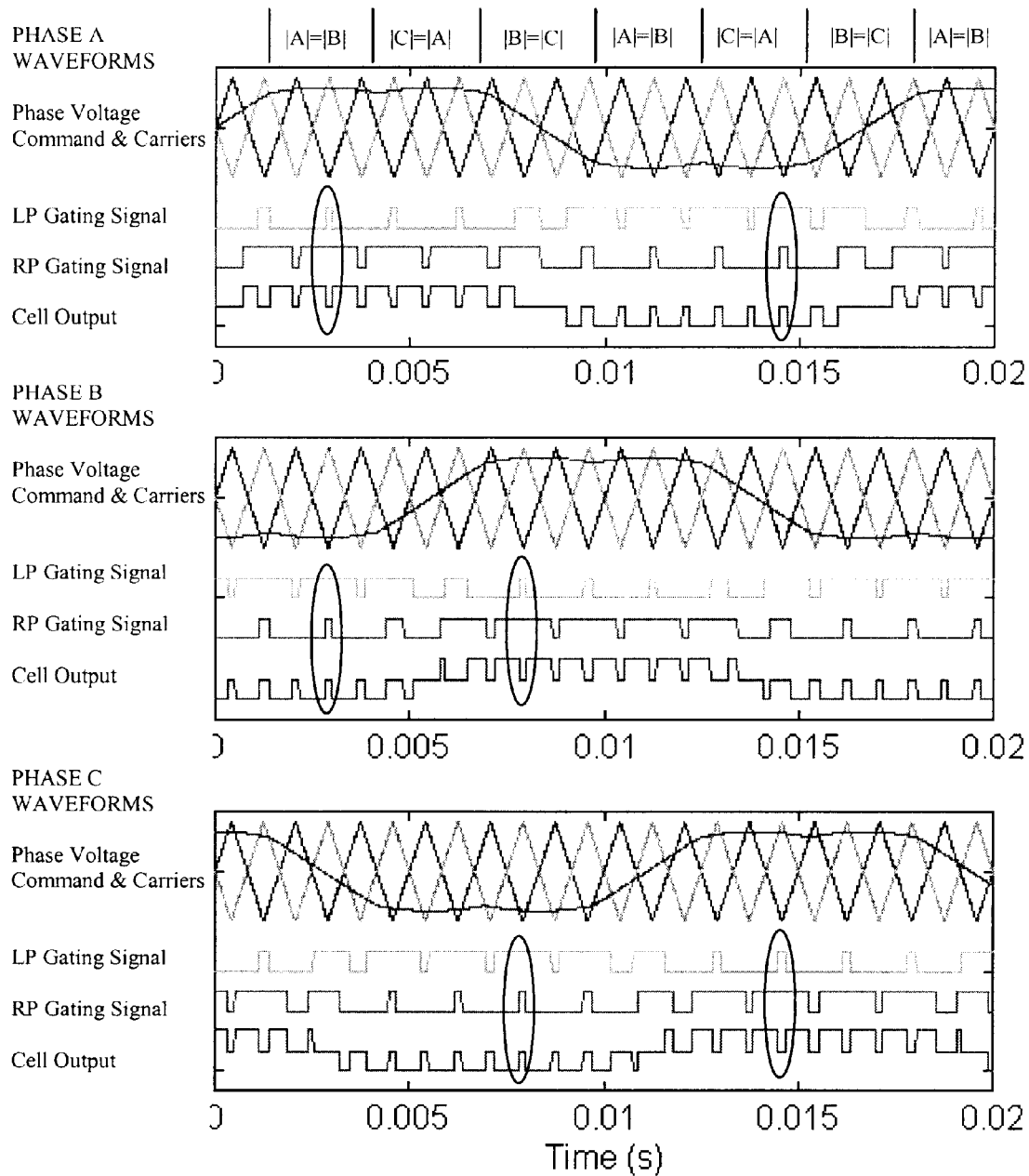
FIG. 3 shows a comparison of the cell outputs for a three phase power supply constructed according to the prior art power circuit of FIG. 1.
Figure 4:
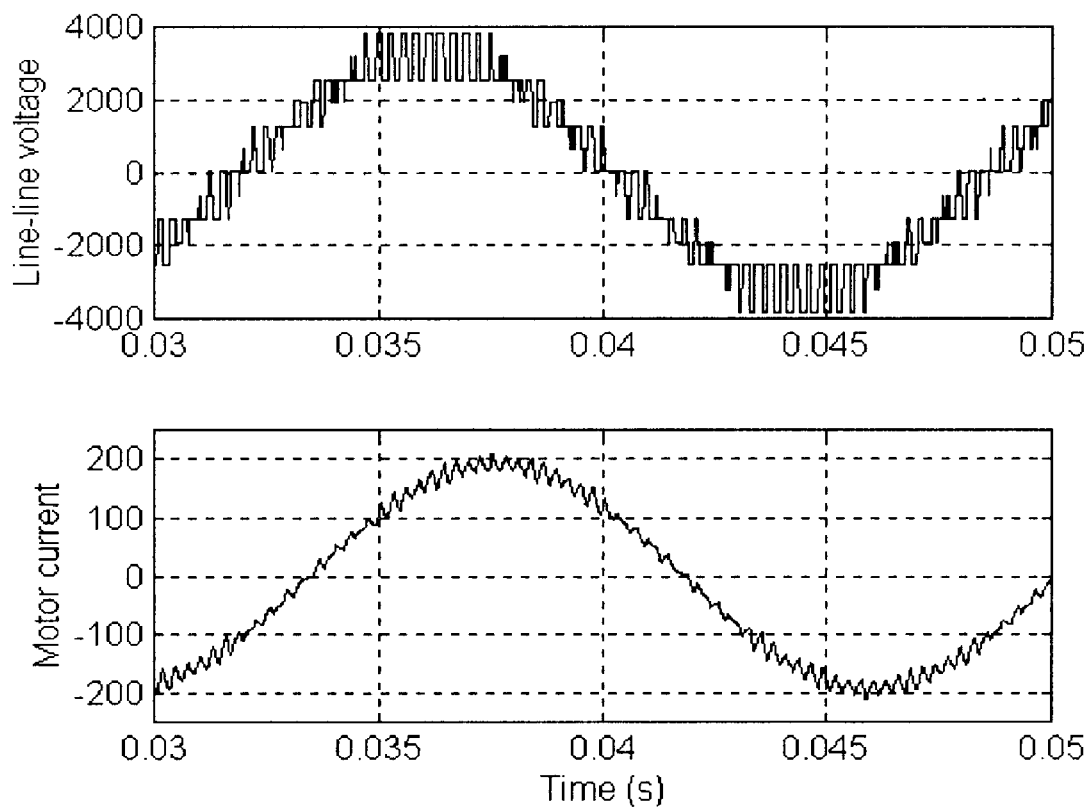
FIG. 4 shows the a graph of the line-to-line voltage and motor current for the three phase supply of FIG. 3, showing the double steps in the line-to-line voltage which is addressed by the current invention.
Figure 7:
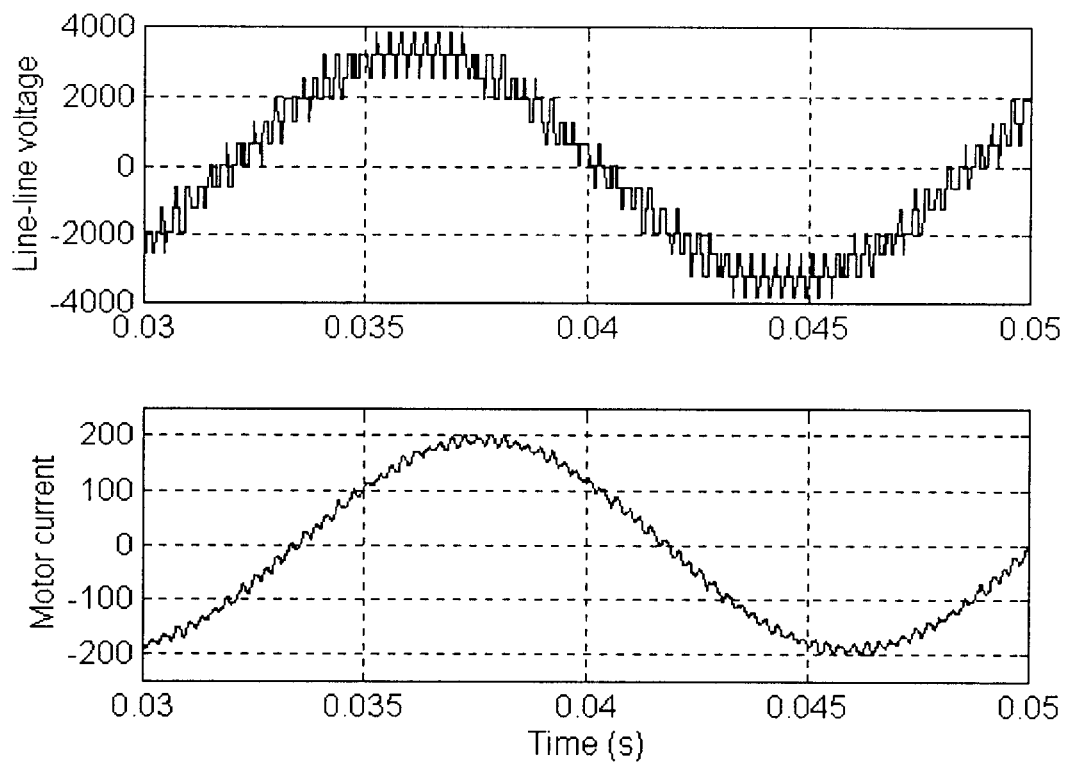
FIG. 7 shows the improved line-to-line voltage and motor current waveforms for a nine cell power supply when controlled according to this invention.

The improved drive voltage and current waveforms for a 9-cell power supply are shown in FIG. 7. Notice that the number of levels in the output voltage waveforms are still the same, but there is a distinct improvement in the voltage waveform as compared to that in FIG. 4. The calculated total harmonic distortion (THD) in the voltage is 16.5% as compared to 20.9% with Hammond's method. The current waveform also appears to have lower ripple and correspondingly lower distortion. This is supported by the THD of 4.7% as compared to 6.1% with the method proposed by Hammond.

Figure 8:
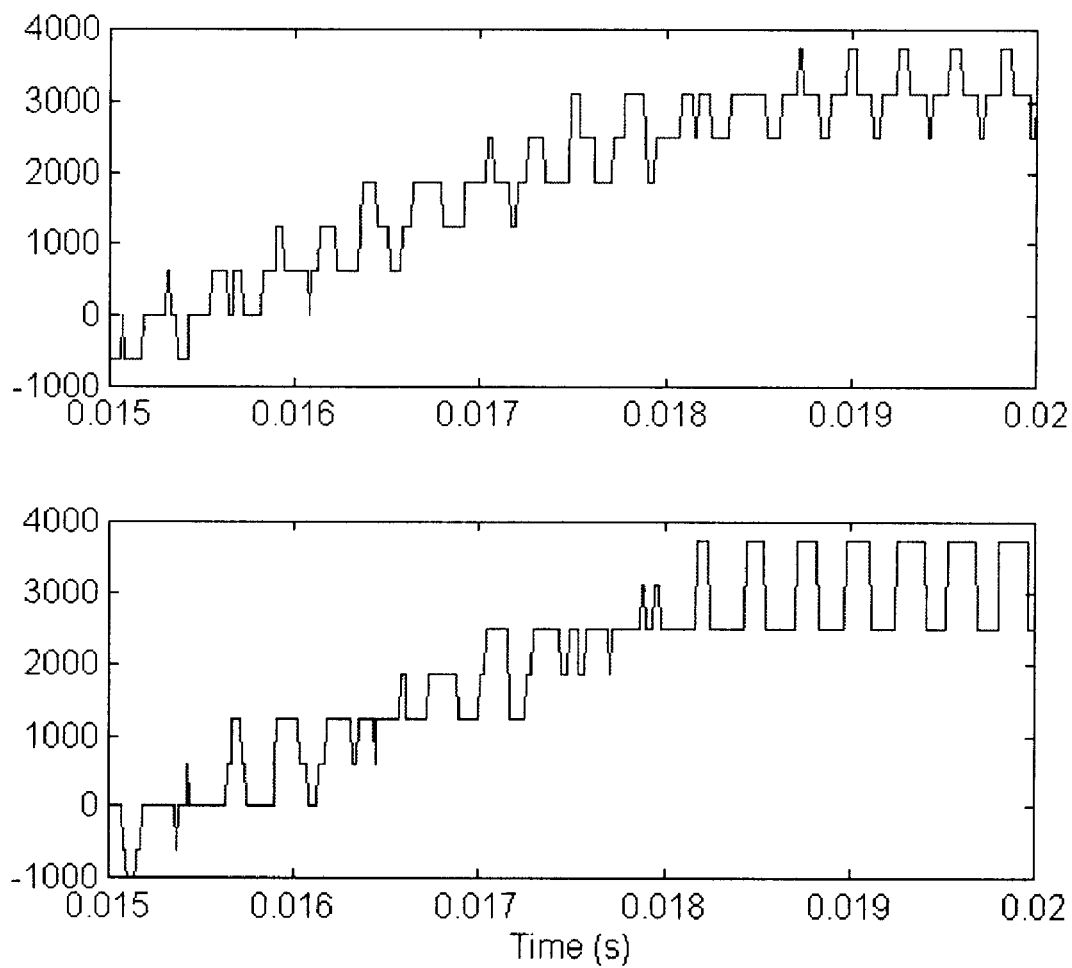
FIG. 8 shows time-expanded views of the prior art line-to-line voltage waveform and the line- to-line voltage waveform according to this invention, for purposes of comparison.
Figure 9:
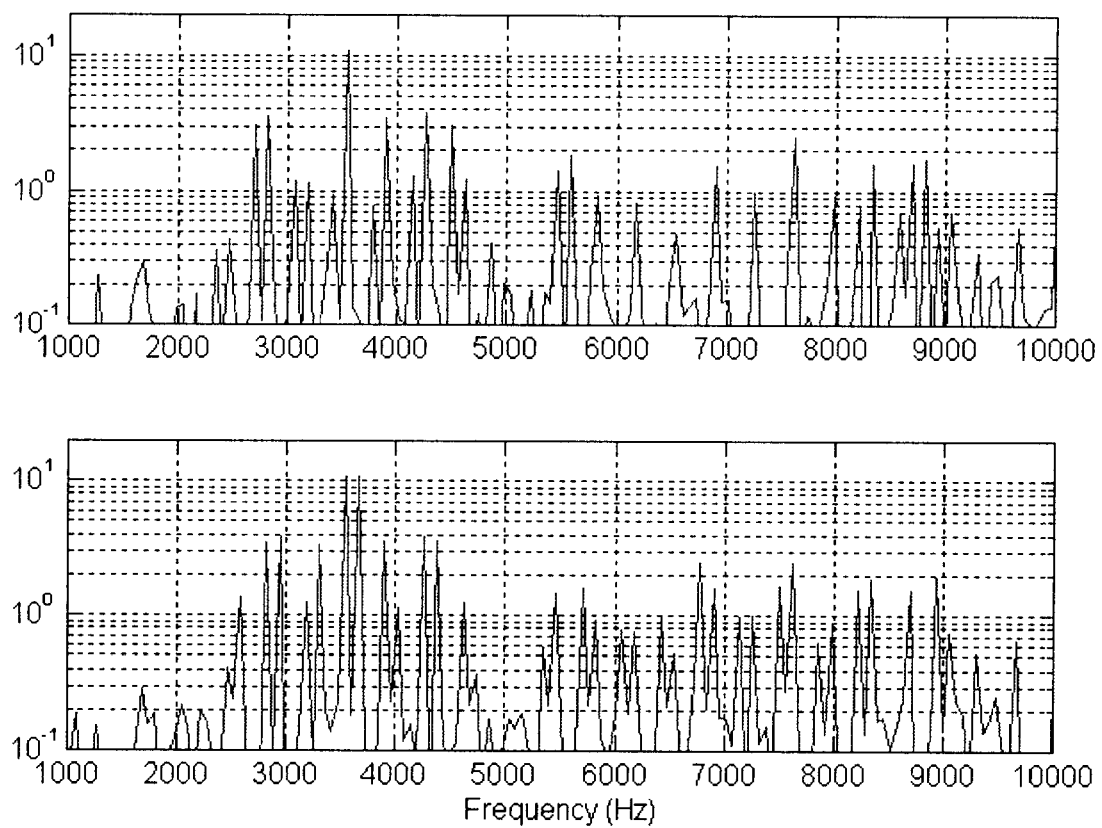
FIG. 9 shows harmonics above 1000 Hz of the line-to-line voltage waveform of the prior art method, and of a power supply according to the method of the present invention.

Time-expanded views of line-to-line voltage waveforms from prior art and the proposed method are compared in FIG. 8. With the proposed method, double-steps are completely avoided when the line-to-line voltage is near its peak. However, double steps do appear in the region around zero voltage, though there are fewer such transitions as compared to those obtained with the method proposed in prior art. Fewer harmonic components are observed with the proposed method when the harmonic spectra of the two voltage waveforms are considered. FIG. 9 only shows harmonics above 1000 Hz in order to focus on the differences in the spectra.

Figure 10:
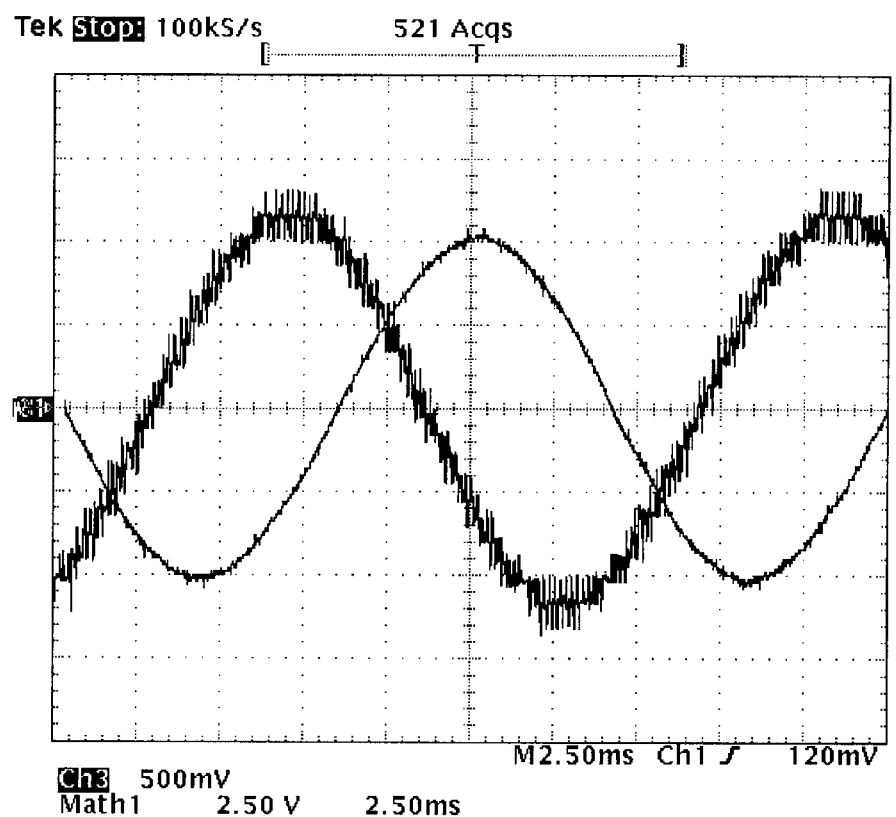
FIG. 10 shows line-to-line voltage and current waveforms for an experimental 12-cell power supply operated according to the method of the present invention.

FIG. 10 shows experimental waveforms of line-to-line voltage and load current for a 12-cell power supply operating an AC motor with the proposed modulation method. The voltage waveform shows that double peaks are avoided near the peak as described above.

The proposed method is not meant to be limited to the exemplary circuit topology considered herein, but can be applied to other multi-level topologies wherein cells are connected in series to obtain higher voltages, or wherein cells are connected in parallel to obtain higher currents. Nor is the method limited to those topologies disclosed in Hammond.

We claim:

1. In a multi-level, multi-phase power supply wherein each phase comprises one or more power cells, each of said power cells having a pulse width modulated output, an improvement comprising controlling the transitions of said pulse width modulated outputs of said power cells to avoid the simultaneous transitions of said outputs of corresponding power cells in different phases.

2. The improvement of claim 1 wherein each of said power cells has left and right output poles switched by a gating signal, said gating signal being a function of a comparison between a command voltage waveform and a periodic carrier waveform, said improvement further comprising eliminating simultaneous switching of said left pole gating signal of a power cell in any phase and said right pole gating signal of a corresponding cell in any other phase, when the magnitude of said command voltage waveform is equal for both of said phases.

3. The improvement of claim 1 wherein said pulse width modulated output of each of said power cells is controlled as a function of a comparison between a command voltage waveform and a periodic carrier waveform, said improvement further comprising eliminating a simultaneous change in opposite directions of said output of corresponding power cells in two phases when said command voltage waveform for each of said cells is equal in magnitude.

4. The improvement of claim 2 further comprising phase shifting said carrier waveform supplied to corresponding power cells in each phase.

5. The improvement of claim 3 further comprising phase shifting said carrier waveform supplied to corresponding power cells in each phase.

6. The improvement of claim 4 wherein said carrier waveforms in neighboring power cells are phase shifted 180/PN degrees, where P is the number of phases and N is the number of power cells per phase.

7. The improvement of claim 5 wherein said carrier waveforms in neighboring power cells are phase shifted 180/PN degrees, where P is the number of phases and N is the number of power cells per phase.

8. A method of reducing distortion in the output waveform of a multi-level, multi-phase power supply having multiple power cells in each phase comprising the steps of:
    providing a periodic carrier waveform to each of said power cells;
    providing a command voltage waveform for each phase of said power supply;
    pulse width modulating the output of each of said power cells as a function of a comparison between said carrier waveform and said command voltage waveform; and
    phase shifting said carrier waveform for corresponding power cells in all phases.

9. The method of claim 8 wherein said step of phase shifting said carrier waveform comprises the step of phase shifting said carrier waveform for neighboring cells 180/PN degrees, wherein P is the number of phases in said power supply and N is the total number of power cells in each of said phases.

10. The method of claim 9 wherein said carrier waveform is a triangle wave.

* * * * *

UNITED STATES PATENT AND TRADEMARK OFFICE
CERTIFICATE OF CORRECTION

PATENT NO. : 6,411,530 B2
DATED : June 25, 2002
INVENTOR(S) : Peter Hammond and Mukul Rastogi It is certified that error appears in the above-identified patent and that said Letters Patent is hereby corrected as shown below:

<u>Title page,</u>
Item [56], References Cited, please add the following:
-- 5,852,553    12/1998    Stacey
5,703,767    12/1997    Stacey
5,625,545    04/1997    Hammond
3,958,173    05/1976    Christianson et al.

Connolly, A.P., Fox, R.W., Golden, F.B., Gorss, D.R., Korn, S.R., Locher, R.E., S.J. Wu SCR Manual Fifth Edition General Electric, Syracuse, Ny 13201 --

Signed and Sealed this

Twelfth Day of November, 2002

*Attest:*

*Attesting Officer*

JAMES E. ROGAN
*Director of the United States Patent and Trademark Office*